United States Patent [19]
Boileau et al.

[11] 4,316,001
[45] Feb. 16, 1982

[54] ANIONIC POLYMERIZATION OF HETEROCYCLIC MONOMERS WITH ALKALI METAL AMIDE HYDROXYLATED COMPOUND INITIATOR

[75] Inventors: Sylvie L. Boileau, Paris; Serge L. Lecolier, Janville sur Juine; Serge F. Raynal, Villejuif, all of France

[73] Assignee: Societe Nationale des Poudres et Explosifs, Cedex, France

[21] Appl. No.: 61,288

[22] Filed: Jul. 27, 1979

Related U.S. Application Data

[62] Division of Ser. No. 800,036, May 24, 1977, Pat. No. 4,254,247.

[51] Int. Cl.$^3$ .................... C08G 77/08; C08G 69/20; C08G 63/10; C08G 59/68
[52] U.S. Cl. ........................ 528/14; 528/20; 528/21; 528/28; 528/312; 528/315; 528/317; 528/358; 528/379; 528/408; 528/409
[58] Field of Search .............. 528/315, 317, 312, 358, 528/408, 409, 379, 14, 28, 20, 21

[56] References Cited

U.S. PATENT DOCUMENTS

| | | | |
|---|---|---|---|
| 2,181,771 | 11/1939 | Scott | 526/346 |
| 2,327,082 | 8/1943 | Walker | 526/346 |
| 2,849,432 | 8/1958 | Kibler et al. | 526/346 |
| 3,240,772 | 3/1966 | Natta et al. | 526/180 |
| 3,609,129 | 9/1971 | Krasulina et al. | 526/211 |
| 3,763,077 | 10/1973 | Eusebi et al. | 528/315 |
| 3,935,177 | 1/1976 | Muller et al. | 526/180 |

FOREIGN PATENT DOCUMENTS

| | | |
|---|---|---|
| 2449784 | 4/1976 | Fed. Rep. of Germany . |
| 1426747 | 3/1976 | United Kingdom . |

OTHER PUBLICATIONS

Bywater–Progress in Polymer Science, vol. 4, (1974), pp. 27–53.
Frisch et al.–Ring–Opening Polymerization, (1969), Marcel Dekker, pp. 1–11, 14, 111–112, 164–165, 327–329.
Furukawa et al., Polymerization of Aldehydes and Oxides, Interscience, (1963), pp. 155–161, 167–169.
Chemical Abstracts, vol. 81, (1974), 119,287n.
Chemical Anstracts, vol. 87, (1977), 84412t.

*Primary Examiner*—Harold D. Anderson
*Attorney, Agent, or Firm*—Bucknam and Archer

[57] ABSTRACT

An initiator for the anionic polymerization of heterocyclic monomers comprises the product from the association of an alkali metal amide and the salt from at least one hydroxylated compound with the same alkali metal in an aprotic solvent. The hydroxylated compound is a primary alcohol, a secondary or tertiary alcohol, an ether alcohol, an amino alcohol, a polyether alcohol, a polyamino alcohol, a polyaminoetheralcohol, or an enol from a ketone.

11 Claims, No Drawings

ANIONIC POLYMERIZATION OF HETEROCYCLIC MONOMERS WITH ALKALI METAL AMIDE HYDROXYLATED COMPOUND INITIATOR

This application is a divisional of U.S. Ser. No. 800,036 filed May 24, 1977, now U.S. Pat. No. 4,254,247.

This invention relates to anionic polymerization and more specifically to novel systems of initiators for anionic polymerization. The invention also relates to a process of anionic polymerization which utilizes the novel initiators of this application and to the polymerizations which are obtained by means of this process.

The first instances of anionic polymerization were carried out by Wurtz with ethylene oxide and they were particularly reported by this author in publications which go back to 1863 (Annales de Chimie et de Physique, volume 69, pages 330-334) and 1878 (Comptes rendus hebdomadaires des Seances de l'Academie de Sciences de Paris, volume 86, pages 1176 etc.). Later Matthews and Strange in British Pat. No. 24790 which issued in 1910 described the anionic polymerizations of dienes and in 1914 Schlenk and co-workers reported in Chemische Berichte, volume 47, pages 473 et seq. work with the anionic polymerization of styrene.

However, the credit of explaining the mechanism of anionic polymerization is particularly due to Ziegler in Germany with his work which began in 1925. The mechanism of anionic polymerization is the same for vinyl monomers, heterocyclic monomers or dienic monomers.

While a great deal of research work has confirmed the hypotheses formulated at a very early date with respect to the mechanism of the reaction, several groups of workers have concentrated on a search for novel initiators, a fact which demonstrates the importance of finding novel initiators for a successful anionic polymerization on an industrial scale.

In this connection it is proper to differentiate between the simple anionic polymerization which is involved in the present invention and the anionic polymerization through coordination which uses such initiators as the salts of aluminum, antimony and transition metals such as for instance the bi-metallic catalysts of Ziegler and Natta and which is not involved in the present invention.

Within the scope of the simple anionic polymerization sodium historically has been mainly known as initiator and also organo-derivatives of sodium such as sodium-naphthalene and above all organo-lithium compounds such as lithium-alkyl have been known. These substances are known as initiators suitable for industrial applications.

Unfortunately these initiators in general are expensive because the substances themselves are expensive and further they require some precautions which limit their use, due to the fact mainly that they are not stable under the action of heat and humidity, a fact which renders the storage difficult. On the other hand the effectiveness of these initiators is not always sufficient to give a reaction kinetics which is industrially satisfactory with certain monomers.

Several solutions have been proposed particularly with respect to the latter difficulty. For instance it has been possible to modify the activity of the lithium-alkyl by means of tertiary polyamines and polyethers, as described in British Pat. No. 1,066,667, a process which produces copolymers with a random structure. Similarly it has been possible to intensify the action of the lithium-alkyl by means of polyethylene glycols, as described in British Pat. No. 1,076,897, aminoalcohols and alkoxyalcohols as described by Maruhashi and Takida, Die Makromolekulare Chemie, volume 124 (1969), pages 172-185); lower alcohols as described by Wiles and Bywater, Journal of Physical Chemistry, volume 68, No. 7 (1964) pages 1983-1987; alkali alkoxides as described by Hsieh and Wofford, Journal of Polymer Science, Part A-1, volume 7 (1969), pages 449-469. An increase in activity in the same order has been noted by association of an alkoxy-alcohol with a magnesium alkyl as described by Narita et al, Polymer Journal, volume 4, No. 4 (1973), pages 421-425 or association of sodium or potassium tertiary butoxide with a sodium alkyl as described by Tai Chun Cheng et al, Journal of Polymer Science, volume 11 (1973), pages 253-259 or with an alkali metal as described by Tai Chun Cheng et al, Ibid, volume 14 (1976), pages 573-581.

In spite of the fact that a great variety of initiators has been proposed, they all have in common the property of comprising at least one constituent which is inherently a very good initiator under the experimental conditions or under similar conditions. Certainly the results would be achieved merely by the association of two constituents which are per se initiators. These facts do not allow to avoid the innumerable limitations mentioned hereinabove which are the results of the chemical reactivity of these initiators.

Applicants have now discovered an initiator for anionic polymerization which permits to alleviate the disadvantages mentioned hereinabove and which results from the association of two types of compounds such that both constituents, if they were used alone, would be either completely inactive as initiators or active as initiators only under extremely favorable conditions, for instance in the polymerization of propylene sulfide or under special conditions totally devoid of any industrial value, for instance with respect to liquid ammonia. The initiators according to the present invention are useful for the polymerization of all heterocyclic monomers which are known to polymerize by a simple anionic mechanism and the polymerization is carried out in a solvent which is either non-polar or mildly polar.

The initiators according to the present invention are characterized by the fact that they result from the association in the presence of a solvent of an alkali amide and the salt of the same alkali metal with at least one hydroxylated compound. According to a preferred embodiment of the invention the initiators are obtained by reaction of the same amide with the hydroxylated compound corresponding to the salt.

These associations have already been noted by Caubère and Loubinoux in Bulletin de la Societe Chimique France (1968), pages 3857-3861 and Ibid (1969), pages 2483-2489 and they have been called "complex bases". Coudert in the thesis submitted in Nancy, France on October 22, 1974 has shown that some of these "complex bases" may be utilized in order to carry out certain reactions and particularly the reactions of alkylation, carbonatation and elimination.

Among the hydroxylated compounds the alkali salts of which in association with the amides of the same metal yield the "complex bases" which are particularly suitable as initiators in the reactions of anionic polymerization, the following substances should be particularly noted:

primary alcohols of formula R—OH in which R is a linear alkyl group, which contains preferably more than two carbon atoms or a branched alkyl group or an alkyl group substituted by a cycloalkyl group or by a cyclic ether or a linear alkyl group substituted by at least one ethylenic double bond and comprising at least two carbon atoms or substituted by at least one aromatic group.

secondary or tertiary alcohols of formula R'—OH in which R' is a linear or branched alkyl, cycloalkyl or polycycloalkyl.

aromatic hydroxy compounds of formula R"—OH in which R" is aryl or polyaryl which may optionally be substituted by alkyl, alkoxy or aminoalkyl groups.

bitertiary glycols containing an alkyl chain in which the hydroxyl groups are in position 1,2,-1,3 or -1,4.

ether alcohols, amino alcohols, polyether alcohols, polyamino alcohols and polyaminoetheralcohols of formula R—Y—CHR$_1$—CHR$_2$—$_n$—OH (I) in which R is alkyl, cycloalkyl, arylalkyl, alkylaryl or aryl, and in which Y is an oxygen atom or a nitrogen atom substituted by an alkyl group, the Y's being either all oxygen atoms or all substituted nitrogen atoms, or being both oxygen and substituted nitrogen atoms. Further R$_1$ and R$_2$ may be the same or different and specifically may be a hydrogen atom, methyl or ethyl but Y is necessarily an oxygen atom when R$_1$ and/or R$_2$ are methyl or ethyl and N is an integer number between 1 and 10.

ether alcohols of formula

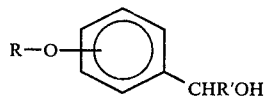

in which R has the meaning indicated hereinabove and R' is a hydrogen atom or a group

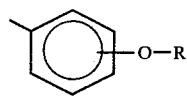

enols of ketones of formula

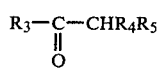

(vinyl alcohols) in which R$_3$ is a hydrocarbon radical and in which R$_4$ and R$_5$ are the same or different and are a hydrogen atom or a hydrocarbon radical.

Other hydroxylated compounds which are suitable within the scope of the invention are diolamines of formula

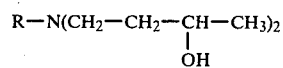

in which R is alkyl and particularly methyl; the aminoalcohol of formula

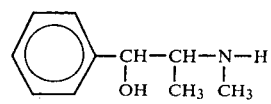

commercial mixtures of mono ethers of polyalkoxy glycols of formula I in which Y is oxygen and N has a value such that the chains contain up to 100 carbon atoms, thiols, thiophenols and trialkylsilanols, other than trimethylsilanols.

It is clear that the preceding list is not exclusive and that other hydroxylated compounds may be used which are also within the scope of the present invention. However these compounds are of more academic interest and/or little economical value.

The common feature which is essential to all the initiators in accordance with the invention is the use of an alkali metal amide. As the amides, only the amide of sodium, lithium and potassium are commercial products. Sodium amide is, however, to a great extent preferable because it gives technically excellent results and it is much less expensive and toxic as compared with lithium amide which is very reactive and irritating to the respitory tract and preferable to potassium amide which is toxic and expensive.

The initiators according to the invention are prepared in the presence of solvents or a mixture of solvents. It should be noted that in the complex bases utilized in the present invention, the alkaline cation participates to the formation of aggregates of which some schematic representations will be given hereinbelow, aggregates which are formed by the amide anions and hydroxylates the latter being formed from the associated hydroxylated compound. The number of molecules of amides which associate with the hydroxy group of the hydroxylated compound is preferably in the order of 3, that is between 2.5 and 3.5. This number may be slightly greater without any interference in the reaction but it should be noted that if it is substantially greater, for instance greater than 10 and particularly if it is substantially lower, for instance less than 2, the initiator may lose its effectiveness either partially or totally. In other words, it is preferable to adjust the amounts of the alkali metal amide and the hydroxylated compound in the solvent in a molar ratio of the amide to the alkali alkoxide in the range of 2 because other ratios generally lead to an initiator which exhibits lower effectiveness and even lack of activity.

The solvents which may be used must be aprotic and may be polar, weakly polar or non-polar. One may utilize polar solvents as long as their chemical structure does not make them reactive under the action of the complex bases utilized in accordance with the invention. For instance hexamethyl-phosphotriamide (HMPT) may be utilized up to a temperature of about 25° C. but for instance dimethylsulfoxide (DMSO), dimethyl formamide (DMF) or N-methylpyrrolidone are decomposed by the complex bases and should preferably be avoided. The polar solvents in any event, within the scope of the present invention, are of little economical and industrial value. Other aprotic solvents of substantially lower polarity may be utilized, for instance pyridine, $\epsilon=12.3$ at 25° C., although they may undergo some sort of degradation at the end of a certain period of time particularly if the temperature is somewhat elevated.

The aprotic, mildly polar solvents, of dielectric constant less than 10° at 25° C. are particularly suitable for the preparation of initiators in accordance with the invention. Therefore, ethers and polyethers, both linear are cyclic such as tetrahydrofuran (THF), dimethoxyethane (DME), dimethyl glycol ethers, diglycol dimethyl ethers and triglycol dimethyl ethers (glymes, diglymes and triglymes) give good results generally in a very short period of time.

However, and this feature is a very substantial advantage of the initiators according to this invention, one may prepare the initiators as easily in a non-polar solvent which is the same as the solvent in which one carries out advantageously the subsequent step of polymerization. Therefore, one may utilize alkanes or cycloalkanes such as for instance hexane, heptane or cyclohexane or aromatic hydrocarbons such as benzene or toluene.

When one utilizes solvents which contain an ether linkage, it is important to carefully eliminate oxygen and peroxides which may be present in the solvent and this may be achieved by known methods.

The preparation of the initiators according to the invention may be carried out by means of several methods which are about equivalent, because what is involved is to place in the presence of a solvent an alkali amide and the hydroxylated compound. However these variations are not equivalent from an economical point of view. In this regard the most interesting method of preparation and which is preferable consists of introducing in a reactor first the solvent, then the alkali amide and finally the hydroxylated compound, advantageously under stirring.

According to the embodiments which are not recommended one may add a suspension of the alkali amide to a solution of the hydroxylated compound in the same solvent or one may place the hydroxylated compound and the amide into a reactor and finally add the solvent alone over the mixture.

It is usually possible, but this embodiment is of no interest, to prepare the initiator in accordance with the invention by placing in a reactor a suspension of the alkali amide in a solvent and a solution of the salt of the hydroxylated compound with the same alkali metal. The latter solution, however, always contains some of the free hydroxylated compound at least in traces. Of course, this method requires that the solution of the salt of the hydroxylated compound be prepared separately and ahead of time. In this case the the preparation of the solution of the salt of the hydroxylated compound is accompanied by the usual well-known disadvantages.

The reaction of formation of the complex base gives rise at the same time to the formation of the initiator according to the invention and to the evolution, which is usually perceptible, of ammonia derived from the action of the amide anion with the proton of the hydroxylated compound. When the complex base is formed, in general one obtains a mixture which forms ordinarily several layers. The lower layer consists of the solid alkali amide which is not in the form of a complex or which is incompletely complexed; the upper layer contains the complex base in a clear solution. With certain solvents one obtains an intermediate layer which is in the form of a milky suspension and which may have the consistency of a gel.

The alkali amide is preferably used crushed in a granular state, the average size of which is a function of the size of the reactor in which the polymerization is carried out. It is important to note that the particle size may be the greater, the greater is the size of the reactor. The crushing step may be carried out in the presence of a small quantity of a solvent which is aprotic and mildly polar.

The alkali amide may be utilized with a degree of purity which may vary from commercial grade up to analytical grade. It may contain a certain amount of soda to the extent that the latter is known to be present in the sodamide and to the extent that it does not interfere with the preparation of the complex base with the proportions of the reagents recommended hereinabove.

With respect to the moisture, it is preferable to remove the moisture from the reagents, the solvent and the reactor and all pieces of equipment being used. However, it should be noted that the cost of sodium amide permits a degree of dryness which is less drastic than in the case of the preparation of known initiators. Actually the utilization of a slight excess of alkali amide permits the elimination of traces of moisture in a very satisfactory manner because the same alkali amide reacts with the traces of moisture present, in order to form products which do not interfere with the reaction of formation of the complex base or the subsequent reaction of polymerization. The reaction of formation of the complex base is advantageously carried out in certain cases in the reactor which subsequently serves for the polymerization and this constitutes an advantage because it permits to cut down the introduction of moisture into the apparatus. This reaction of complex base formation is preferably carried out at a temperature between 20° and 60° C. One may operate at a lower temperature but the reaction of formation of the complex base becomes much longer up to a temperature, in general, below about 0° C., at which the rate of reaction is essentially zero. One may operate also at higher temperature but then the possibility of degradation of the alkali amide or degradation of the solvent increases. It is recommended to keep the reaction medium under agitation.

In the majority of cases, the duration of the reaction of initiator formation is at least one hour but does not exceed four hours. In any event a much more prolonged heating may turn out to be necessary in some cases in which the materials are less reactive.

Finally it should be noted that the initiators in accordance with the present invention offer a versatility of use which rarely has been encountered with the initiators known in the art. In fact if one must prepare the initiators for reasons of convenience or necessity in a solvent which is not the same as the solvent in which the polymerization later is carried out, one usually encounters difficulties; in fact the polarity of the medium is modified and for instance the structure of the polymer which is obtained is not in accordance with expectations. On the other hand the initiators according to this invention may be prepared in a first solvent, for instance a mildly polar solvent and then this solvent is evaporated under vacuo practically to completeness and finally a second solvent, for instance a non-polar solvent in which it is desired to carry out the subsequent polymerization is added above the complex base so that the properties of the complex base remain unaffected. The invention, therefore, permits to achieve the synthesis of the initiator under predetermined conditions without reducing in any way the possibility to carry out the polymerization under the ideal conditions predetermined ahead of time.

The invention also relates to a process of polymerization in which an initiator as described hereinabove is utilized.

It should be noted in this connection that it is possible to associate to the amide several hydroxylated compounds at the same time but it does not appear that this modification gives any particular advantage.

The fact that the initiators according to the invention are being used does not introduce any unusual limitations in the subsequent polymerization reaction.

The temperature at which the polymerization is carried out is not necessarily the same as the temperature at which one prepares the initiator and may be between −80° C. and +70° C. On the other hand one may vary the temperature during the polymerization, a fact which is particularly advantageous when copolymerizations are carried out and a specific distribution of the copolymerized species is desired or when a particular microstructure or a more rapid reaction kinetics are desirable.

The quantity of the initiator required for the process clearly depends in general on the average molecular weight which one desires to achieve, for instance a molar ratio of amide to monomer in the order of 1% may be used but it is proper to stress the fact that it is possible to utilize a higher ratio and this is even more so since the amide is a substance of relatively low cost.

The duration of the polymerization reaction depends on several factors. It varies from a period of a few seconds up to 24 and even 48 hours.

It should be noted that one of the most significant features of this invention is that the polymerization may be carried out by means of either a heterogeneous or a homogeneous initiator. In fact it is possible to utilize only the upper clear supernatant of the complex base and carry out the reaction in a homogeneous medium, a fact which gives rise to rapid reactions and molecular weights over a narrow range. However, it is also possible to utilize the entire system of the complex base or only the lower pasty layer and in the latter case the polymerization is initiated at a rate which is more or less substantial by means of an initiator in a heterogenous phase, a fact which results in particular properties of the resulting polymers, for instance the molecular weight distribution of the polymer is in general more scattered.

As in the case of all anionic polymerizations it is advantageous to utilize only reagents, solvents and all pieces of equipment which are dry. However, this limitation which affects the success of the polymerization is less strongly noted when one utilizes the process according to the present invention, because the alkali amide, which is a substance of low cost, has the property of reacting with traces of moisture and giving products which do not interfere either with the initiation nor the propagation of the reaction and which do not cause an undesirable premature termination.

The termination of the reaction may be achieved in a known manner for instance by introduction of a proton-containing agent such as an alcohol, for instance methanol or hexanol and/or by precipitation of the reactive reaction system in methanol.

It is very desirable to purify the solvents as well as the reagents. The solvents, which are the same as the solvents in which the complex base may be formed, a fact which particularly groups together all the solvents of dielectric constant less than 10 at 25° C., are purified in a manner well-known to chemists familiar with anionic polymerization. It is, therefore, possible to proceed for example by distillation over soda or potassium hydroxide and afterwards optionally by distillation over sodium and finally drying over sodium wire. As far as the monomers are concerned, they are purified in known and conventional manner according to their chemical structure and this varies from a single distillation to a double distillation over molecular sieves, calcium hydroxide, alkali metal or even a living polymer such as isoprenyl-lithium.

The monomers which are interesting within the scope of this invention are, as it has already been discussed hereinabove, those substances which are known to polymerize by a purely anionic mechanism or in other words, monomers which are susceptible to anionic polymerization by opening of an heterocyclic ring. Keeping in mind that anionic polymerizations have been investigated for more than a century, it is clear that the number of monomers which are capable of anionic polymerization is very long and the mechanism of the reaction is well known.

The heterocyclic monomers which are interesting within the scope of this invention are, as it has already been discussed hereinabove, those substances which are known to polymerize by a purely anionic mechanism or in other words, heterocyclic monomers which are susceptible to anionic polymerization by opening of an heterocyclic ring. Keeping in mind that anionic polymerizations have been investigated for more than a century, it is clear that the number of heterocyclic monomers which are capable of anionic polymerization is very long and the mechanism of the reaction is well known. The initiation occurs by cleavage of an heterocyclic bond with resulting formation of an anionic monomer, independintly from the nature of the atom which carries the negative charge. The negative anionic monomer attacks a new monomer molecule which carries in turn the negative charge and so on until all the monomer has reacted or until the reaction ends. In this connection reference is made for instance to the work of Professor Georges Champetier, "Chimie Macromoleculaire", Volume I, Hermann Edition, Paris (1969).

Among the heterocyclic monomers, there may be mentioned alkylene oxides, alkylene sulfides, lactones, lactams, thietanes, siloxanes, cyclic carbonates and also ethylene oxide, propylene oxide, propylene sulfide, β-propiolactone, ε-caprolactone, pivalolactone, ε-caprolactam, hexamethyl cyclotrisiloxane, octamethyl-cyclo-tetrasiloxane, propylene glycol carbonate, neopentyl glycol carbonate and others.

The process according to the present invention is applicable to reactions of homopolymerization and reactions of copolymerization with heterocyclic monomers which may be of the same general type as well as heterocyclic monomers which may be of a totally different type.

The process of polymerization according to the invention is preferably carried out in an inert atmosphere, for instance nitrogen or argon or under vacuo. The process is particularly but not exclusively interesting when it is utilized with the following initiators which are designated hereinbelow for the sake of simplicity by the amide and the hydroxylated compound which is associated with the amide to form the complex base.

Na NH$_2$, a linear or branched primary alcohol such as:
  NaNH$_2$, 2-methyl propanol
  NaNH$_2$, 2,2-dimethyl propanol
Na NH$_2$, an alcohol which has attached to it an heterocyclic group such as:

NaNH$_2$, tetrahydrofurfuryl alcohol
LiNH$_2$, tetrahydrofurfuryl alcohol
Na NH$_2$, an alcohol which carries an ethylenic double bond or an aromatic group such as:
  NaNH$_2$ allyl alcohol
Na NH$_2$, secondary or tertiary alcohol such as:
  NaNH$_2$, 2,6-dimethyl 3-heptanol
  NaNH$_2$, isopropanol
  NaNH$_2$, neopentyl alcohol
  NaNH$_2$, t-butanol; also KNH$_2$, t-butanol
  NaNH$_2$, 2-methyl 2-hexanol
  NaNH$_2$, 2-methyl 2-butanol
  NaNH$_2$, 5-n-butyl 5-nonyl alcohol
Na NH$_2$, alicyclic alcohol such as:
  NaNH$_2$, 2-methyl cyclohexanol
  NaNH$_2$, adamantanol
Na NH$_2$, aromatic hydroxy compound such as:
  NaNH$_2$ phenol
  NaNH$_2$ diethylaminophenol
Na NH$_2$, polyol, particularly a glycol such as:
  NaNH$_2$, 2,5-dimethyl 2,5-hexanediol
Na NH$_2$, ether alcohol such as:
  NaNH$_2$, methyl ether of ethylene glycol
  NaNH$_2$, butyl ether of ethylene glycol
  NaNH$_2$, phenyl ether of ethylene glycol
  NaNH$_2$, methoxyphenylmethanol
  NaNH$_2$, di(methoxyphenyl) methanol
Na NH$_2$, polyether alcohol such as:
  NaNH$_2$, methyl ether of diethylene glycol
  NaNH$_2$, ethyl ether of diethylene glycol
  LiNH$_2$, or KNH$_2$, ethyl ether of diethylene glycol
  NaNH$_2$, butyl ether of diethylene glycol
  NaNH$_2$, phenyl ether of diethylene glycol
  NaNH$_2$, decyl ether of diethylene glycol
  NaNH$_2$, ethyl ether of triethylene glycol
  NaNH$_2$, butyl ether of triethylene glycol
  NaNH$_2$, ethyl ether of pentaethylene glycol
  NaNH$_2$, ethyl ether of hexaethylene glycol
Na NH$_2$, enol from a ketone such as:
  NaNH$_2$, diethyl ketone (in the enolic form)
  NaNH$_2$, methylphenyl ketone (in the enolic form).

It is clear from the foregoing that the alkali amides and particularly sodium amide may be associated with a great number of hydroxylated compounds to give an effective initiator. This effectiveness is clearly a function of the monomer being reacted because certain monomers polymerize almost spontaneously and others very slowly under certain experimental conditions. It should be noted that the preceding list is not exclusive and that many other complex bases may be formed from the association of many other amides and hydroxylated compounds which are still useful within the scope of the invention.

It should be noted that the alkali amides which have been considered hereinabove as far as it is known at present, are incapable of giving rise to any significant extent to an initiation of the anionic polymerization from the monomers which are capable of undergoing this reaction. This invention is, therefore, very surprising to one skilled in the art who did not know of the very specific and very special cases of initiation under the action of alkali amides. Moreover one skilled in the art would have been convinced not to carry out research along these lines the more so because the substituted amides are much more reactive and more expensive than the alkali amides and further the substituted amides which are known to initiate certain polymerizations have limitations. In this connection ANGOOD et al in Journal of Polymer Science, Vol. 11, 2777–2791 (1973) have shown that styrene may be initiated by means of the diethyl amide of lithium only in the presence of solvents which have a little polarity, while this monomer which in general polymerizes quite easily, does not undergo polymerization in hydrocarbon solvents.

It is, therefore, appropriate to note that the initiators according to the invention must be distinguished from the products resulting from the association of butyl lithium, for instance with ethers by a mechanism of complex formation which is different from the mechanism of complex formation between the amide and the substance to which the amides becomes associated. In fact this complex formation in accordance with the invention is not limited to a simple solvation but results equally from a bond of the electrostatic type which may be illustrated in schemes A and B hereinbelow and which very likely gives rise to aggregates

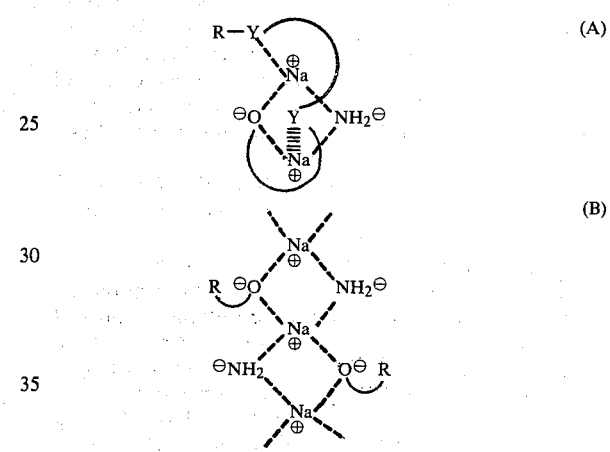

In scheme A, for instance in which a polyether alcohol is used it is likely that at the same time both solvation and electrostatic bonds are present; in scheme B in which R is alkyl for instance it is likely that only electrostatis bonds are present.

The present invention should be also distinguished from the processes in which the activity of the anion starting material is intensified by means of cryptates which literally enclose the associated ketone in a cage. This process is described in British patent 1,426,747. In the latter case the ketone is only sequestered because of the existence of coordination bonds with the hetero atoms of the cryptate. The advantages of the process according to the present invention have already been described to a great extent hereinabove. It is, however, appropriate to note that sodium amide offers the advantage with respect to the organo lithium compounds ordinarily used because of the ease of storage and indeed one can only use solutions of organo lithium compounds of relatively low concentration while sodium amide is a solid. Further, sodium amide may be used with ease since traces of moisture interfere less with the process according to the present inventions as compared with processes in which lithium alkyls are used. Finally the initiators of the present invention are advantageous because of the high ratio of effectiveness/cost particularly if one considers that the initiators according to the invention have general application and may be used in inexpensive hydrocarbon solvents. Still another advantage is that the cost of sodium amide which is a commercial product, is relatively low. On the other hand it is possible to observe that for the purpose of comparing sodium amide to organo lithium compounds, both sodium and liquid ammonia which are the starting materials cost much less than lithium and alkyl halides and finally that in the case of organo lithium compounds one half of the lithium is not used because of the reaction $RX = 2\ Li \rightarrow R - Li + LiX$.

Another substantial advantage of the initiators according to the present invention is that they provide a great deal of possibilities. For instance it is possible to modify the average molecular weight within a great range and also to modify the molecular weight distribution and/or the microstructure of the polymer from a given monomer, simply by modifying for instance one of the experimental conditions such as the temperature, the reaction time, the nature of the solvent or the nature of the hydroxylated compound, the other conditions remaining the same. Finally one of the characteristic features of the process is that it permits, if desired, to obtain polymers in which one of the terminal groups is an amino group which may be caused to react further. This property is particularly interesting in the case of oligomeric prepolymers which can be prepared very easily according to the present invention as already discussed hereinabove.

The invention, therefore, finds application in the synthesis of polymers with a great range of possibilities as well as special polymers.

In the examples which follow, which are given hereinbelow for the purpose of illustrating the invention and which should not be considered as limiting the present invention, emphasis has been given to showing the variety of possibilities offered by the initiators according to this invention as well as the innumerable modifications of the process as described hereinabove. The following are examples according to this invention. In general, however, it should be noted that the invention permits to achieve a very large range of molecular weights simply by modifying the hydroxylated compound which is associated with the sodium amide.

EXAMPLE 1

This example illustrates the polymerization of hexamethyl cyclotrisiloxane in the amount of $3.25.10^{-2}$ mole under vacuo by means of an initiator prepared from diethylene glycol ethyl ether, the latter in the amount of $1.9.10^{-4}$ mole and lithium amide, the latter in the amount of $4.6.10^{-4}$ mole. The molecular ratio of the amide to the hydroxylated compound is 2.4.

Tetrahydrofuran in the amount of 3 cc is used as a solvent for the $C_2H_5(OCH_2CH_2)_2OH$. The mixture is allowed to stand under stirring for a period of 12 hours at 20° C. The solvent is then removed by distillation into an attached vessel. Then toluene, in the amount of 16.5 cc is added and the initiator is formed by heating the mixture for a period of two hours at 60° C. The flask is then cooled to room temperature and the monomer is added. The polymerization is allowed to proceed at 25° C. for a period of two days. THF in the amount of 1.75 cc is then added for the purpose of accelerating the propagation. The reaction mixture is allowed to stand 24 hours at 25° C. and it is then heated at 50° for a period of three hours. Finally acetic acid is added for the purpose of terminating the polymerization. The yield of the polysiloxane, precipitated in methanol, after filtration and drying is 39% $[\eta]=0.33$ dl/g in toluene at 25° C. $Mv=75,000$.

EXAMPLE 2

$\epsilon$-caprolactone is polymerized in an atmosphere of nitrogen by means of an initiator system consisting of lithium amide and diethylene glycol monoethyl ether. The amounts used are as follows:

| E-caprolactone | $3.75\ 10^{-2}$ mole |
|---|---|
| $NH_2Li$ | $2.96\ 10^{-3}$ mole |
| $C_2H_5(OCH_2CH_2)_2OH$ | $8.95\ 10^{-4}$ mole |
| Toluene | 30 cc |

The initiator is prepared by heating at 60° C. for two hours. The temperature is then brought to room temperature, the monomer is added and the mixture is allowed to stand 24 hours at 25° C. The polymerization is terminated by addition of a small quantity of methanol. The yield of the polymer is 45%.

$[\eta]=0.07$ dl/g in benzene at 30° C.

EXAMPLE 3

This example illustrates the polymerization of $\beta$-propiolactone under nitrogen with an initiator system consisting of $LiNH_2$ and $C_2H_5(OCH_2CH_2)_2OH$. The amounts used are as follows:

| $\beta$-Propiolactone | $6.4\ 10^{-2}$ mole |
|---|---|
| $NH_2Li$ | $2.96\ 10^{-3}$ mole |
| $C_2H_5(OCH_2CH_2)_2OH$ | $8.95\ 10^{-4}$ mole |
| Toluene | 30 cc |

The initiator is prepared as in Example 2 and the polymerization is carried out according to the procedure therein described. The yield of the polymer is 69% after 24 hours at 25° C.

$[\eta]=0.21$ dl/g in $CHCl_3$ at 25° C.

EXAMPLE 4

Pivalolactone is polymerized in an argon atmosphere with a system consisting of sodium amide and tetrahydrofurfuryl alcohol. The amounts of materials used are as follows:

| Pivalolactone | 0.1 mole |
|---|---|
| $NaNH_2$ | $2.5\ 10^{-2}$ mole |
| Tetrahydrofurfuryl alcohol | $8.3\ 10^{-3}$ mole |
| Toluene | 30 cc |

The initiator is prepared by heating at 45° for a period of three hours. The monomer is introduced into the system cooled at $-40°$ C. Immediately the reaction mixture solidifies. The reaction mixture is allowed to stand five minutes and the reaction is then terminated by addition of 2 cc of methanol.

The yield of quantitative, the melting point is 155° C.

The polymer certainly has a relatively low molecular weight because the melting point reported in the literature is about 245° C.

EXAMPLE 5

Polymerization of propylene sulfide. This polymerization is carried out from 0.13 mole of monomer with a system consisting of sodium amide, $25.10^{-3}$ mole and diethylene glycol monobutyl ether, the latter in the amount of $8.13.10^{-3}$ mole in the presence of 20 cc of THF in argon atmosphere.

The initiator is prepared by heating at 40° C. for a period of three hours. Polymerization occurs instantaneously at room temperature with a strong evolution of heat. A brown polymer is obtained in quantitative yield. The value of Mn determined osmometrically is as follows:

$50000 < Mn < 80000$.

EXAMPLE 6

The same initiator is used for the preparation of the same polymer with the same quantities of materials but in the presence of 20 cc of toluene. The preparation of the initiator is carried out by heating three hours at 45° C. The monomer is introduced into the vessel at a temperature of −40° C. The reaction medium becomes immediately black. After standing two hours at 25° C., the reaction is terminated by addition of $C_2H_5Br$.

The yield is quantitative.

$[\eta] = 0.23$ dl/g in benzene at 25° C.

EXAMPLE 7

The polymerization of propylene sulfide in the amount of $5.1.10^{-2}$ mole is carried out with an initiator system consisting of $2.1.10^{-3}$ mole of sodium amide and $5.2.10^{-4}$ mole of diethylene glycol monoethylether in 50 cc of THF in a nitrogen atmosphere. The initiator is prepared by heating at 60° C. for a period of two hours. The polymerization reaction time is 24 hours at 25° C. Yield 72%. Mn (by osmometry) is 90000.

It should be noted that if the reaction is carried out under similar conditions but without the hydroxylated compound, the yield is much lower after a substantially longer reaction time, that is 72 hours at 25° C. instead of 24 hours at 25° C. In the latter case the yield is 20% and Mn (osmometry) is 49500.

EXAMPLE 8

The carbonate of 1,3-propanediol 0.1 mole, is polymerized by means of $25.10^{-3}$ mole of sodium amide and $8.3.10^{-3}$ mole of diethylene glycol monobutyl ether in the presence of 20 cc of THF in an atmosphere of argon. The initiator is prepared by heating at 45° C. for a period of three hours. A gel is formed instantaneously upon introduction of the monomer at 25° C. The reaction is terminated after one hour at 25° C. by addition of 2 cc of methanol. The yield is 100%. M(GPC)=1000.

EXAMPLE 9

Polymerization of the cyclic 2-methyl 2-hydroxymethyl pentanol carbonate is carried out from $6.3.10^{-2}$ mole of the monomer by means of an initiator consisting of $2.5.10^{-2}$ mole of sodium amide and $8.3.10^{-3}$ mole of diethylene glycol monoethyl ether in the presence of 20 cc of THF and in an atmosphere of argon. The initiator is prepared by heating at 45° C. for a period of three hours. Upon addition of the monomer a gel is immediately formed. The reaction is terminated by addition of 2.5 cc of methanol after one-half hour at 25° C. The gel disappears. After standing 48 hours the material forms a gel again. The yield is quantative, the polymer is obtained in the form of white powder of melting point of 54° C. M(GPC)=1425.

EXAMPLE 10

The polymerization of the cyclic carbonate from 2-ethyl 2-hydroxymethyl hexanol, $5.4.10^{-2}$ mole, is carried out by means of $2.5.10^{-2}$ mole of sodium amide and $8.3.10^{-3}$ mole of diethylene glycol monobutyl ether in the presence of 20 cc of THF in an atmosphere of argon. The initiator is prepared by heating at 45° C. for a period of three hours. A gel is immediately formed upon addition of the monomer at 25° C. The reaction is terminated after one hour at 25° C. The yield is quantative. M(GPC) 1350.

EXAMPLE 11

Propylene oxide in the amount of 0.15 mole is polymerized with the same initiator used in the previous example and the reaction is carried out in the same way. The initiator system and the monomer are allowed to stand at 25° C. After 10 hours a slightly viscous oil is obtained. Yield: 30%; Mn=600.

EXAMPLE 12

The polymerization of a mixture of hexamethylcyclotrisiloxane (10 g or $4.5.10^{-2}$ mole) and octamethylcyclotetrasiloxane (10 g or $3.4.10^{-2}$ mole) is carried out. The initiator is prepared from $2.5.10^{-2}$ mole of sodium amide and $8.3.10^{-3}$ mole of diethylene glycol monobutyl ether in 20 cc of toluene at 45° C. for a period of three hours. The initiator is then added to the mixture of monomers and the polymerization is allowed to proceed for 10 days at 25° C. The product is a slightly viscous oil suggesting that it consists of oligomers. Yield: 40%; Mn=3600.

EXAMPLES 13-20

Allyl carbonate and diethylene glycol carbonate (10 cc) are polymerized by means of an initiator according to the invention prepared by association of sodium amide ($25.10^{-3}$ mole) and several hydroxylated compounds ($8.10^{-3}$ mole) as shown in the table below.

The polymerization is carried out at 40° C. except in Example 156 in which the temperature is 30° C.

| Ex. N° | Hydroxylated Compound | Solvent cc | Reaction time in hours | Yield | Observations |
|---|---|---|---|---|---|
| 13 | Bu (OCH$_2$CH$_2$)$_2$OH | THF 38 | 3 | 67 | The initiator solution is milky white and polymerization is immediate upon introduction of the monomer with color change to orange. Mn = 4700. |
| 14 | tetrahydrofurfuryl alcohol | THF 42 | 3 | 68 | Same, except that the color change is to yellow; Mn = 5000. |
| 15 | Bu OCH$_2$CH$_2$OH | THF 40 | 3 | 70 | Same, Mn = 2300. |
| 16 | tBuOH | THF 41 | 3 | 53 | Same, Mn = 2900. |
| 17 | Bu (OCH$_2$CH$_2$)$_2$OH | Toluene 43 | instantaneous | 40 | The initiator solution is milky white and polymerization occurs immediately upon introduction of monomer; the product is filtered immediately; yellow color; Mn = 4000. |
| 18 | tetrahydrofurfuryl alcohol | Toluene 37 | " | 48 | Same, Mn = 3800. |
| 19 | Bu OCH$_2$CH$_2$OH | Toluene | | | Same, Mn = 1200. |

| Ex. N° | Hydroxylated Compound | Solvent cc | Reaction time in hours | Yield | Observations |
|---|---|---|---|---|---|
| | | 39 | " | 45 | |
| 20 | tBuOH | Toluene | | | Same, except that product is brown. Mn = 1250. |
| | | 40 | " | 62 | |

EXAMPLES 21-23

Vinyl carbonates are polymerized by utilizing the initiators according to the invention.

The initiator is prepared as described previously, at 60° C. by stirring for a period of two hours, from $25.10^{-3}$ mole of sodium amide and $8.3.10^{-3}$ mole of the hydroxylated compound. In each instance the polymerization occurs instantaneously.

| Ex. N° | Hydroxylated Compound | Solvent | Monomer cc | Temperature | Yield | Mn |
|---|---|---|---|---|---|---|
| 21 | Et (OCH2CH2)2OH | THF 30 cm3 | Phenyl carbonate and vinyl carbonate | 40° C. | 80% | 360 |
| 22 | Bu (OCH2CH2)2OH | THF 20 cm3 | Methyl carbonate and vinyl carbonate | 50° C. | 100% | 450 |
| 23 | Bu (OCH2CH2)2OH | THF 30 cm3 | diethylene carbonate and vinyl carbonate | 30° C. | 100% | 800 |

EXAMPLE 24

Polymerization of ethylene oxide for the initiator is prepared as described in Example 1 from $25.10^{-3}$ mole of $NaNH_2$ and $8.3.10^{-3}$ mole of diethylene glycol monobutylether in 20 cc of THF. Ethylene oxide, in the amount of 8.5 g is introduced into the suspension and heated for 1½ hours at 30° C. The reaction mixture is then allowed to stand 20 hours at room temperature. The reaction is terminated by means of 1 cc of methanol. The polymer is precipitated in hexane and has Mn=1900. Yield: 30%.

Infrared Analysis Data

The polypropylene oxide prepared as described in Example 11 is examined by infrared analysis. There are noted strong peaks at 1610 cm$^{-1}$ and 3300 cm$^{-1}$ which show the existence of amino and hydroxy groups in the terminal position of the polymer.

What is claimed is:

1. A process of polymerization of an heterocyclic monomer which is capable of undergoing anionic polymerization by opening of the heterocyclic ring in the presence of an initiator and a solvent, which comprises polymerizing said heterocyclic monomer in the presence of an initiator which comprises an association product prepared from at least two moles of an alkali metal amide which is lithium amide, sodium amide or potassium amide and one mole of at least one compound which is an hydroxylated compound, in an aprotic solvent.

2. A process of polymerization according to claim 1 wherein the initiator is prepared from sodium amide and an hydroxylated compound which is a member selected from the group consisting of a primary linear or branched alcohol; an alcohol substituted by an heterocyclic group, an alcohol containing the ethylenic unsaturation or which is substituted by an aromatic group, a secondary alcohol, a tertiary alcohol, an alicyclic alcohol, an aromatic alcohol, a polyhydroxy compound and ether-alcohol, a polyether-alcohol, an enol from a ketone and an amino alcohol.

3. The process according to claim 2 wherein the hydroxylated compound is a member selected from the group consisting of:

a primary alcohol of formula R—OH in which R is a linear alkyl group, or a branched alkyl group or an alkyl group substituted by a cycloalkyl group or by a cyclic ether group or a linear alkyl group substituted by at least one ethylenic double bond and comprising at least two carbon atoms or substituted by at least one aromatic group;

a secondary or tertiary alcohol of formula R'—OH in which R' is a linear or branched alkyl, cycloalkyl or polycycloalkyl;

an aromatic hydroxy compound of formula R"—OH in which R" is aryl or polyaryl;

a bitertiary glycol containing an alkyl chain in which the hydroxyl groups are in position 1,2; 1,3 or 1,4;

an ether alcohol, an amino alcohol, a polyether alcohol, a polyamino alcohol or a polyaminoetheralcohol of formula R—(Y—CHR$_1$—CHR$_2$)$_n$—OH (I) in which R is alkyl, cycloalkyl, arylalkyl, alkylaryl or aryl, Y is an oxygen atom or a nitrogen atom substituted by an alkyl group, the Y's being all oxygen atoms or all substituted nitrogen atoms, or being both oxygen and substituted nitrogen atoms; R$_1$ and R$_2$ being the same or different and being H, methyl or ethyl, Y being oxygen when at least R$_1$ is methyl or ethyl and n is an integer number between 1 and 10;

an ether alcohol of formula

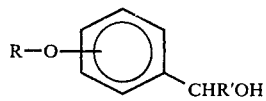

in which R has the meaning indicated hereinabove and R' is H or a group

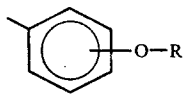

or an enol from a ketone of formula $$R_3-C-CHR_4R_5$$
$$\parallel$$
$$O$$

in which $R_3$ is a hydrocarbon radical and $R_4$ and $R_5$ are the same or different and each of $R_4$ and $R_5$ is H or a hydrocarbon radical.

4. A process of polymerization according to claim 2 wherein the initiator consists of the association product selected from the group consisting of:
NaNH₂ with dodecanol
NaNH₂ with 2,2-dimethyl propanol
NaNH₂ with 2-methyl propanol
NaNH₂ with tetrahydrofurfuryl alcohol
NaNH₂ with allyl alcohol
NaNH₂ with 2,6-dimethyl 3-heptanol
NaNH₂ with isopropanol
NaNH₂ neopentyl alcohol
NaNH₂ with t-butyl alcohol
NaNH₂ with 2-methyl 2-hexanol
NaNH₂ with 2-methyl 2-butanol
NaNH₂ with 5-n-butyl 5-nonanol
NaNH₂ with 2-methyl cyclohexanol
NaNH₂ with adamantanol
NaNH₂ with phenol
NaNH₂ with diethylaminophenol
NaNH₂ with 2,5-dimethyl 2,5-hexanediol
NaNH₂ with ethylene glycol methyl ether
NaNH₂ with ethylene glycol butyl ether
NaNH₂ with methoxyphenylmethanol
NaNH₂ with di(methoxyphenyl) methanol
NaNH₂ with ethylene glycol phenyl ether
NaNH₂ with diethylene glycol methyl ether
NaNH₂ with diethylene glycol ethyl ether
NaNH₂ with diethylene glycol butyl ether
NaNH₂ with diethylene glycol phenyl ether
NaNH₂ with diethylene glycol decyl ether
NaNH₂ with triethylene glycol ethyl ether
NaNH₂ with triethylene glycol butyl ether
NaNH₂ with pentaethylene glycol ethyl ether
NaNH₂ with hexaethylene glycol ethyl ether
NaNH₂ with diethyl ketone (enol form)
NaNH₂ with methylphenyl ketone (enol form)
LiNH₂ with tetrahydrofurfuryl alcohol
LiNH₂ with diethylene glycol ethyl ether
KNH₂ with t-butanol and
KNH₂ with diethylene glycol ethyl ether.

5. The process according to claim 3 wherein R in said ROH is a linear alkyl group containing more than two carbon atoms.

6. The process according to claim 2 wherein the hydroxylated compound is a diolamine of formula

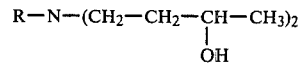

in which R is alkyl, or an aminoalcohol of formula

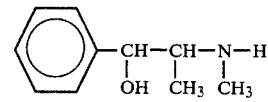

7. The process according to claim 2 wherein the hydroxylated compound is a mixture of mono ethers of polyalkoxy glycols of formula $R(Y-CHR_1-CHR_2)_n-OH$, in which Y is oxygen and n has a value such that the chains contain up to 100 carbon atoms.

8. The process according to claim 1 wherein said initiator is the product from the association of three molecules of said alkali metal amide with one molecule of said hydroxylated compound.

9. The process according to claim 1 wherein the initiator is prepared at a temperature between 20° C. and 60° C.

10. A process of polymerization of an heterocyclic monomer which is capable of undergoing anionic polymerization by opening of the heterocyclic ring in the presence of an initiator and a solvent, wherein the heterocyclic monomer is a member selected from the group consisting of 1,2-alkylene oxides, 1,2-alkylene sulfides, lactones, lactams, thietanes, siloxanes, and cyclic carbonates, which comprises polymerizing said heterocyclic monomer in the presence of an initiator which comprises an association product prepared from at least two moles of an alkali metal amide which is lithium amide, sodium amide or potassium amide and one mole of at least one compound which is an hydroxylated compound, in an aprotic solvent.

11. A process of polymerization of an heterocyclic monomer which is capable of undergoing anionic polymerization by opening of the heterocyclic ring in the presence of an initiator and a solvent, which comprises polymerizing said heterocyclic monomer in the presence of an initiator which comprises an association product prepared by reacting an alkali metal amide which is lithium amide, sodium amide or potassium amide with a solution in an aprotic solvent of the salt of one compound which is an hydroxylated compound with the same alkali metal as in said alkali metal amide.

* * * * *